United States Patent
Van Dyke et al.

(10) Patent No.: US 7,596,647 B1
(45) Date of Patent: Sep. 29, 2009

(54) URGENCY BASED ARBITER

(75) Inventors: James M. Van Dyke, Austin, TX (US);
Brian D. Hutsell, Fort Worth, TX (US)

(73) Assignee: NVIDIA Corporation, Santa Clara, CA (US)

( * ) Notice: Subject to any disclaimer, the term of this patent is extended or adjusted under 35 U.S.C. 154(b) by 275 days.

(21) Appl. No.: 11/642,130

(22) Filed: Dec. 19, 2006

Related U.S. Application Data

(60) Provisional application No. 60/826,006, filed on Sep. 18, 2006.

(51) Int. Cl.
*G06F 13/362* (2006.01)
*G06F 13/36* (2006.01)

(52) U.S. Cl. .................. 710/244; 710/116; 710/241

(58) Field of Classification Search .............. 710/29, 710/52, 112, 113, 116, 118, 309, 240, 241, 710/244
See application file for complete search history.

(56) References Cited

U.S. PATENT DOCUMENTS

| | | | | |
|---|---|---|---|---|
| 5,862,355 A * | 1/1999 | Logsdon | ..................... | 710/116 |
| 5,953,743 A | 9/1999 | Jeddeloh | | |
| 6,105,086 A * | 8/2000 | Doolittle et al. | ............... | 710/52 |
| 6,134,625 A | 10/2000 | Abramson | | |
| 6,246,256 B1 * | 6/2001 | Liu et al. | ...................... | 326/38 |
| 6,304,923 B1 * | 10/2001 | Klein | ......................... | 710/41 |
| 6,304,932 B1 * | 10/2001 | Ziegler et al. | ............... | 710/112 |
| 6,397,287 B1 * | 5/2002 | Brown et al. | ................ | 710/305 |
| 6,425,032 B1 * | 7/2002 | Prasanna | ..................... | 710/117 |
| 6,804,736 B2 * | 10/2004 | Olarig | ......................... | 710/240 |
| 7,028,121 B2 * | 4/2006 | Chae | .......................... | 710/240 |
| 7,093,059 B2 | 8/2006 | Christenson | | |
| 7,099,972 B2 * | 8/2006 | Chao | .......................... | 710/118 |
| 7,263,566 B2 * | 8/2007 | Ganasan et al. | ............. | 710/118 |
| 7,424,557 B2 * | 9/2008 | Houg | .......................... | 710/52 |
| 2003/0177296 A1 * | 9/2003 | Kurth | ......................... | 710/244 |
| 2005/0091460 A1 | 4/2005 | Rotithor et al. | | |
| 2007/0266196 A1 | 11/2007 | Torii | | |

OTHER PUBLICATIONS

Office Action for U.S. Appl. No. 11/642,791 dated Nov. 20, 2008.

* cited by examiner

*Primary Examiner*—Mark Rinehart
*Assistant Examiner*—Trisha Vu
(74) *Attorney, Agent, or Firm*—Townsend and Townsend and Crew LLP

(57) ABSTRACT

An arbiter decides to grant access from multiple clients to a shared resource (e.g. memory) using efficiency and/or urgency terms. Urgency for a client may be determined based on an "in-band" request identifier transmitted from the client to the resource along with the request, and an "out-of-band" request identifier that is buffered by the client. A difference between the out-of-band request identifier and the in-band request identifier indicates the location of the request in the client buffer. A small difference indicates that the request is near the end of the buffer (high urgency), and a large difference indicates that the request is far back in the buffer (low urgency). Efficiency terms include metrics on resource overhead, such as time needed to switch between reading/writing data from/to memory via a shared memory bus, or bank management overhead such as time for switching between DRAM banks.

23 Claims, 6 Drawing Sheets

URGENCY BASED ARBITER

CROSS-REFERENCES TO RELATED APPLICATIONS

This application claims the benefit of U.S. Provisional Application No. 60/826,006, filed Sep. 18, 2006, entitled "Arbiter Using Efficiency and/or Urgency Terms," the disclosure of which is incorporated herein by reference in their entirety. The present application is also related to commonly-assigned co-pending U.S. patent application Ser. No. 11/642,791, filed on the same date herewith, entitled, "Efficiency Based Arbiter," which is incorporated by reference herein as if set forth fully.

BACKGROUND

In an asynchronous computer system, two or more autonomous units may request access to a common resource (e.g. a memory) within a short time of one another. If the requests are sufficiently separated in time, a first request can be recognized and serviced before a second request is received. However, in highly parallel processing systems where a number of processes execute simultaneously, it is a very common occurrence that multiple processes request access to the common resource at substantially the same time (e.g., within a few clock cycles of one another).

To handle the overlapping requests, an arbiter determines how to allocate the resource to each of the requesting units (allocating the resource is also referred to as servicing the request, or granting access to the resource). Generally, the time needed for the arbiter to decide which process should get access to the shared resource should be as short as possible, since a long decision time adds directly to access time, increasing client read latency.

The arbiter may allocate access to the shared resource using one or more known schemes. In a predetermined priority scheme, processes are assigned predetermined levels of priority, and the arbiter generally prefers a higher priority process over a lower priority process. In a time-based scheme, the arbiter generally prefers a process that generated a request long ago, over a process that generated a request only a short time ago.

However, known schemes for arbitration may be suboptimal in several regards.

BRIEF SUMMARY

As described further herein, an arbiter grants access to one of multiple clients for a shared resource (e.g., memory) using efficiency and/or urgency terms. Urgency (or priority) as used herein refers generally to latency tolerance of a client. Urgency for a client may be determined based on an "in-band" request identifier transmitted from the client to the resource along with the request and an "out-of-band" request identifier that is buffered by the client. A difference between the in-band request identifier and the out-of-band request identifier indicates the location of the request in the client buffer. A small difference indicates that the request is near the head of the buffer and that data corresponding to the request will soon need to be processed by the client (high urgency). A large difference indicates that the request is far back in the buffer and that data corresponding to the request will not be processed by the client for some time (low urgency).

Efficiency terms used by the arbiter in granting access to the shared resource include metrics on resource overhead, such as an overhead time needed to switch directions on a shared memory bus (i.e., between reading from or writing data to memory), or management overhead (e.g., time for switching between banks of DRAM, or time for switching between rows of a bank of DRAM).

In one aspect, a system comprises a first client configured to generate a first request for access to a resource, a second client configured to generate a second request for access to the resource, and an arbiter configured to receive the first request for access and the second request for access, and grant access to the resource in an order based on a comparison of urgency of the first request and an urgency of the second request.

In another aspect, a system, comprises a first processing engine, a second processing engine, and an arbiter. The first processing engine is configured to execute a first process that generates a first request for access to a memory. The second processing engine is configured to execute a second process that generates a second request for access to the memory. The arbiter is configured to receive the first request for access and the second request for access, and grant access to the memory in an order based on a comparison of urgency of the first request and an urgency of the second request.

DETAILED DESCRIPTION

FIGS. 1 through 6 illustrate exemplary parallel processing architectures and techniques for arbitration of requests for access to a common resource from a number of clients. However, the systems and methods disclosed herein for are not limited to any particular processing architecture. For example, the architecture described herein includes a computer system with a central processing unit (CPU) and a graphics processing unit (GPU) that supports parallel processing applications. However, the methods described herein are not limited to application on a GPU and instead are broadly applicable to arbitration for virtually any device having a number of clients requesting access to a common resource.

Figure 1:
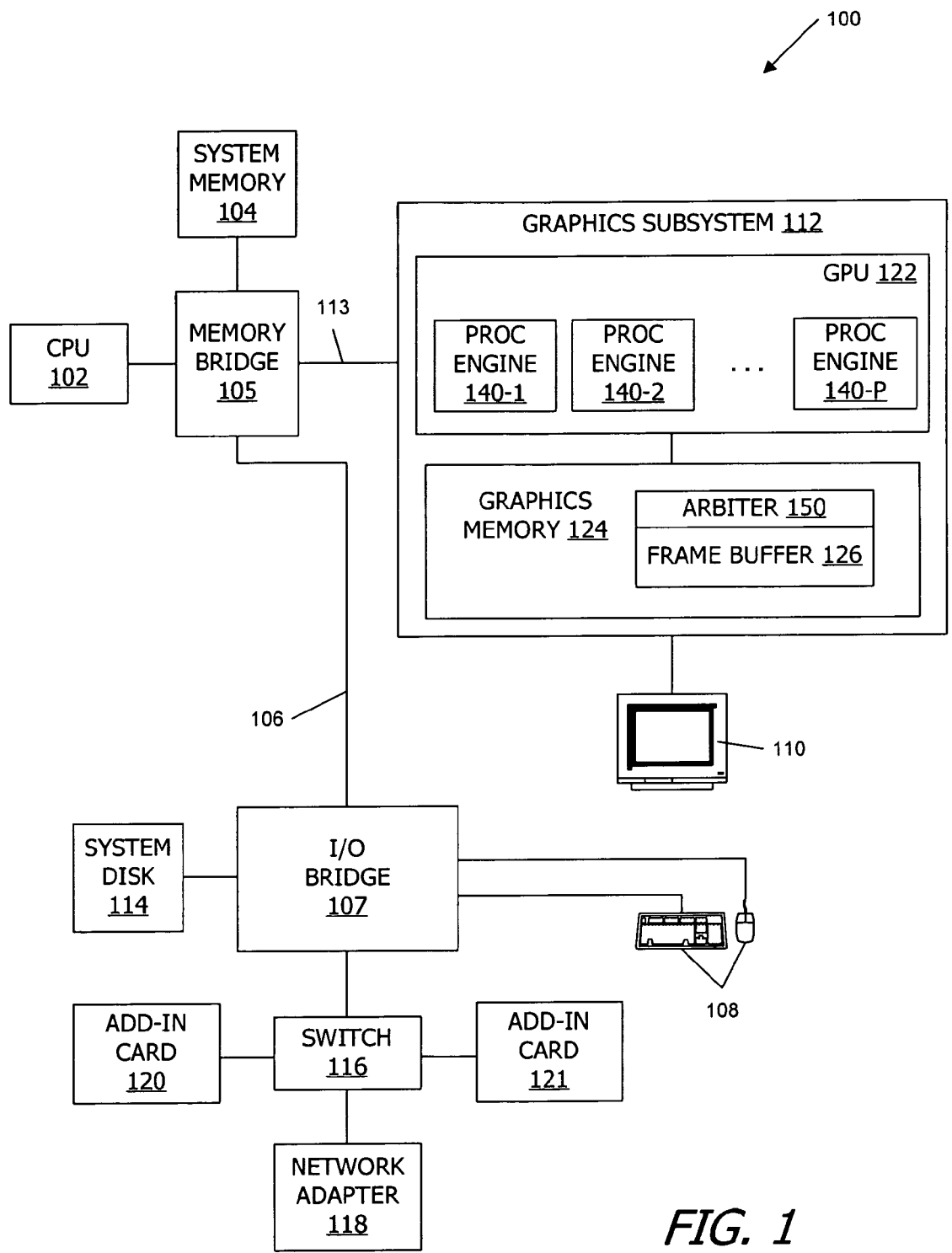
FIG. 1 is a block diagram of a computer system 100 according to one embodiment.

FIG. 1 is a block diagram of a computer system 100 according to one embodiment. Computer system 100 is merely exemplary, and a number of alterations may be made to computer system 100. Computer system 100 includes a central processing unit (CPU) or control processor 102 and a system memory 104 communicating via a communications path that includes a memory bridge 105. CPU 102 operates as the control processor of system 100, controlling and coordinating operations of other system components. Memory bridge 105 (e.g. a Northbridge chip) is connected via a communication path 106 (e.g., a point-to-point connection using the HyperTransport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105.

Visual output is provided on a pixel based display device 110 (e.g., a CRT or LCD based monitor) operating under control of a graphics subsystem 112 coupled to memory bridge 105 via communication path 113, which may be implemented using, e.g., PCI Express (PCI-E), Accelerated Graphics Port (AGP), or any other point-to-point or bus protocol. A system disk 114 is also connected to I/O bridge 107. A switch 116 provides connections between I/O bridge 107 and other components such as a network adapter 118 and various add-in cards 120, 121.

Graphics processing subsystem 112 includes a number N of graphics processing units (GPU) 122 and graphics memories 124, which may be implemented, e.g., using one or more integrated circuit devices such as programmable processors, application specific integrated circuits (ASICs), and memory devices. Each GPU 122 may be configured to perform various tasks related to generating pixel data from graphics data supplied by CPU 102 and/or system memory 104 via memory bridge 105 and bus 113, interacting with graphics memories 124 to store and update pixel data, and the like. For example, GPU 122 may generate pixel data from 2-D or 3-D scene data provided by various programs executing on CPU 102, and may read data from or write data to frame buffer 126 in graphics memory 124.

In some embodiments, GPU 122 includes P parallel processing engines 140-1 to 140-P (collectively, processing engines 140) configured to execute multiple threads in parallel. For example, during a rendering operation, each of the multiple parallel threads might be an instance of a vertex shader program executing on attributes of a single vertex, or an instance of a pixel shader program executing on a given primitive and pixel. During general-purpose computing, each of the multiple parallel threads might be an instance of a program executing on a portion of an input data set and/or producing a portion of an output data set.

As described further below, because processing engines 140 may execute threads of a program in parallel, two or more processing engines 140 may request access to frame buffer 126 at once, or substantially at once (within a few clocks of each other). Therefore, arbiter 150 is provided to determine which of the processing engines 140 may access the various memory resources (e.g., DRAMs) in frame buffer 126. Note that, although arbiter 150 is depicted as within graphics memory 124, arbiter 150 may be located within GPU 122 or elsewhere in graphics subsystem 112.

Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Parallel Processing Pipelines in GPU 122

Figure 2:
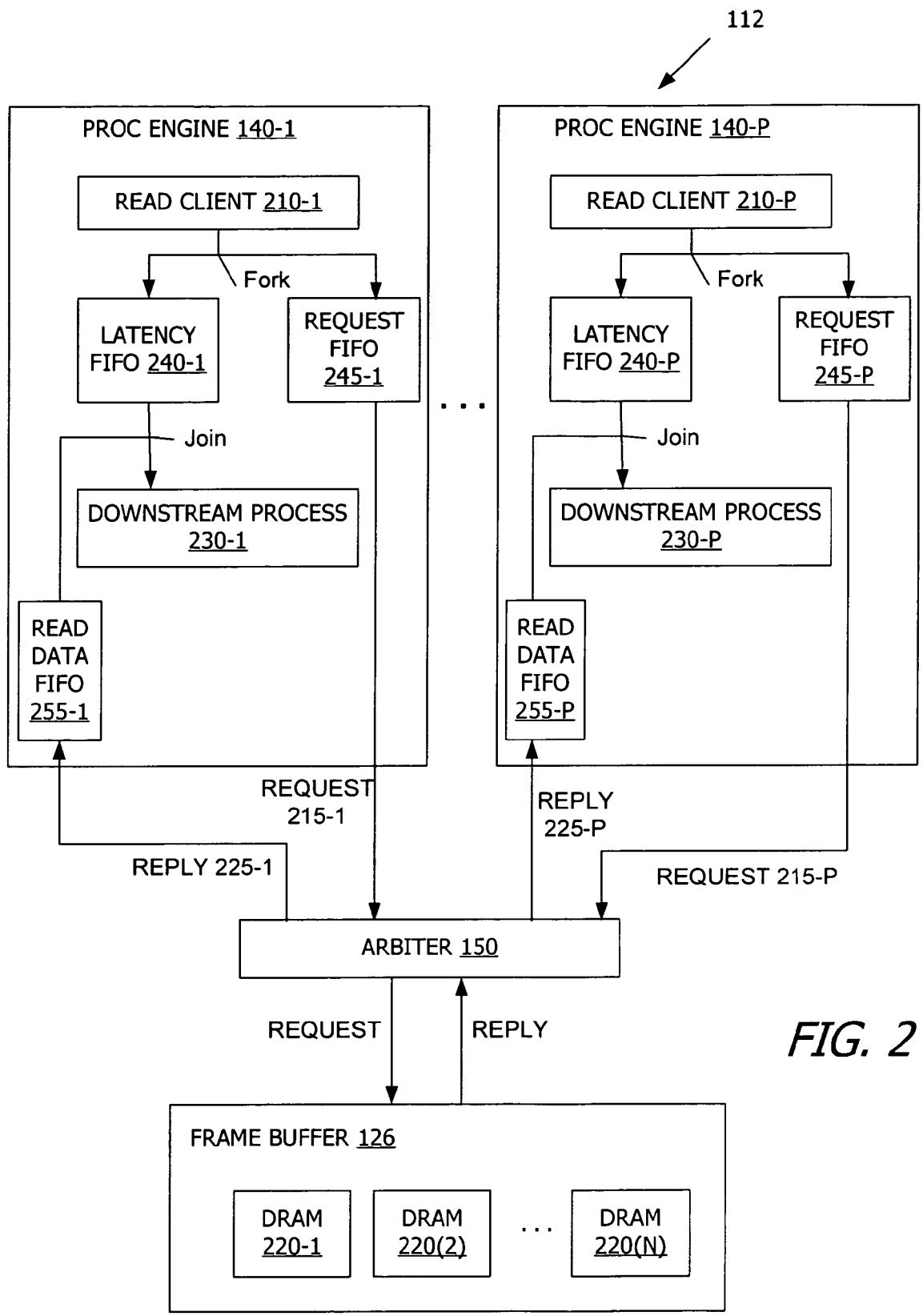
FIG. 2 is a generalized block diagram showing further detail of processing engines 140 configured to read data from frame buffer 126 via arbiter 150 of FIG. 1, according to one embodiment.

FIG. 2 is a generalized block diagram showing further detail of processing engines 140 configured to read data from frame buffer 126 via arbiter 150 of FIG. 1, according to one embodiment.

In overview for a memory read operation, processing engine 140-1 includes a read client 210-1 that generates a request 215-1 to arbiter 150. As described further below, once arbiter 150 determines to service request 215-1, arbiter 150 generates appropriate control signals (address information, DRAM bank precharge signals, DRAM row select signals, and the like) to one or more memory devices (e.g. DRAMs 220-1 to 220-N) of frame buffer 126 in this example. Although memory devices are described as "DRAM," the memory type may include DRAM, SRAM, flash, any other memory type, and/or combinations of such memory types and still maintain the spirit of the invention. Data is read from the appropriate memory devices of frame buffer 126, and a reply 225-1 is returned to a downstream process 230-1 of processing engine 140-1. However, as just described, processing engine 140-1 might stop processing while waiting for reply 225-1 to be returned from frame buffer 126, which takes at least a memory access time (i.e., the amount of time needed to receive request 215-1 into arbiter 150, generate appropriate signals from arbiter 150 to frame buffer 126, and return data from frame buffer 126 back to processing engine 140-1). Stopping processing in processing engine 140-1 underutilizes processing resources in graphics subsystem 112. Because arbiter 150 selects from many clients, and frame buffer 126 has a greater bandwidth than required by any one client, request FIFOs 245 and read return data FIFOs 255 allow throughput to clients 140-1 through 140-P when the memory is servicing other clients.

Therefore, to avoid the need to stop processing in processing engine 140-1, request 215-1 is "forked" from read client 210-1, and information related to request 215-1 may be pipelined in latency FIFO 240-1. Latency FIFO 240-1 maintains internal commands, parameters, data, state, and other information associated with request 215-1 so that information needed to process reply 225-1 may be joined with reply 225-1 and provided to downstream process 230-1. When reply 225-1 is returned from frame buffer 126, downstream process 230-1 can accept information from latency FIFO 240-1 joined with reply 225-1 so that downstream process 230-1 can process the information and the reply. Request FIFO 245-1 and read data FIFO 255-1 smooth out the bandwidth from frame buffer 126 due to its non-uniform throughput. Therefore, as long as latency FIFO 240-1 holds enough information to "cover" the memory access time plus the outstanding references in request FIFO 245-1 and read data FIFO 255-1, pipelines in processing engine 140-1 may be sustained so that processing engine 140-1 need not wait for replies from frame buffer 126.

For example, read client 210-1 may be executing a process to fetch color values from frame buffer 126 so that downstream process 230-1 can then blend the colors and write pixels back into frame buffer 126. Until latency FIFO 240-1 fills up with requests, read client 210-1 can issue multiple requests to arbiter 150. Latency FIFO 240-1 may be made larger than the memory access time to buffer more replies, but doing so adds cost (e.g., with an increase in die area) to graphics subsystem 112.

Note that processing engine 140-1 may "starve" for data if associated information for request 215-1 is present at the output of latency FIFO 240-1, but reply 225-1 (i.e., read data) is not simultaneously present at the input to downstream process 230-1 or read data FIFO 255-1 is empty. In addition, there is no particular benefit to providing reply 225-1 in advance of request 215-1 propagating through latency FIFO 240-1, since downstream process 230-1 cannot process reply 225-1 without information in latency FIFO 240-1. Other references may be ahead of request 215-1 in latency FIFO 240-1 and downstream process 230-1 needs that request and read data first.

Other processing engines (e.g., processing engine 140-P) are similarly configured to processing engine 140-1, though there is no particular requirement that the processing engines 140 be identical. For example, each processing engine 140 may have a different length latency FIFO 240. Further, although a single pipeline is depicted in each processing engine 140, there may be multiple pipelines in series and/or in parallel in one or more of the processing engines 140.

An issue with conventional arbiters is that typically, arbiters do not "know" the priority of read clients and therefore may make suboptimal decisions on which read client to service at any particular time. Conventional arbiters typically utilize a timer that counts down from when a read request was first received into the arbiter, so that recently received requests may be forced to wait upon older requests. This tends to equalize the latency of the requests received into the arbiter but does not allow the arbiter to respond dynamically to system throughput variances that may occur due to variable workloads in processing engines 140. For example, if a conventional arbiter were to receive request 215-1 at substantially the same time as (e.g., within a few clocks of) request 215-P, the conventional arbiter may determine to service request 215-P first, regardless of whether processing engine 140-1 is starving for data or is close to starving for data. Alternatively, if the conventional arbiter does not know when reply 225-1 will be needed by downstream process 230-1 of processing engine 140-1, for example, the conventional arbiter may service request 215-1 in a manner that makes reply 225-1 too early or too late with respect to downstream process 230-1, such that the conventional arbiter may make inefficient use of memory bandwidth.

Note that because requests are loaded into latency FIFO 240-1 in order, even if the conventional arbiter can return data (reply 225-1) out of order, downstream process 230-1 cannot process reply 225-1 until request 215-1 has propagated through latency FIFO 240-1. However, as described further below, arbiter 150 is configured to service clients that have higher urgency, or for the sake of efficiency, and may do so in a manner that services requests out of order between the clients. "Urgency" as used herein refers generally to latency tolerance of a client.

Urgency Determination in Arbiter 150 for Read Clients

Figure 3:
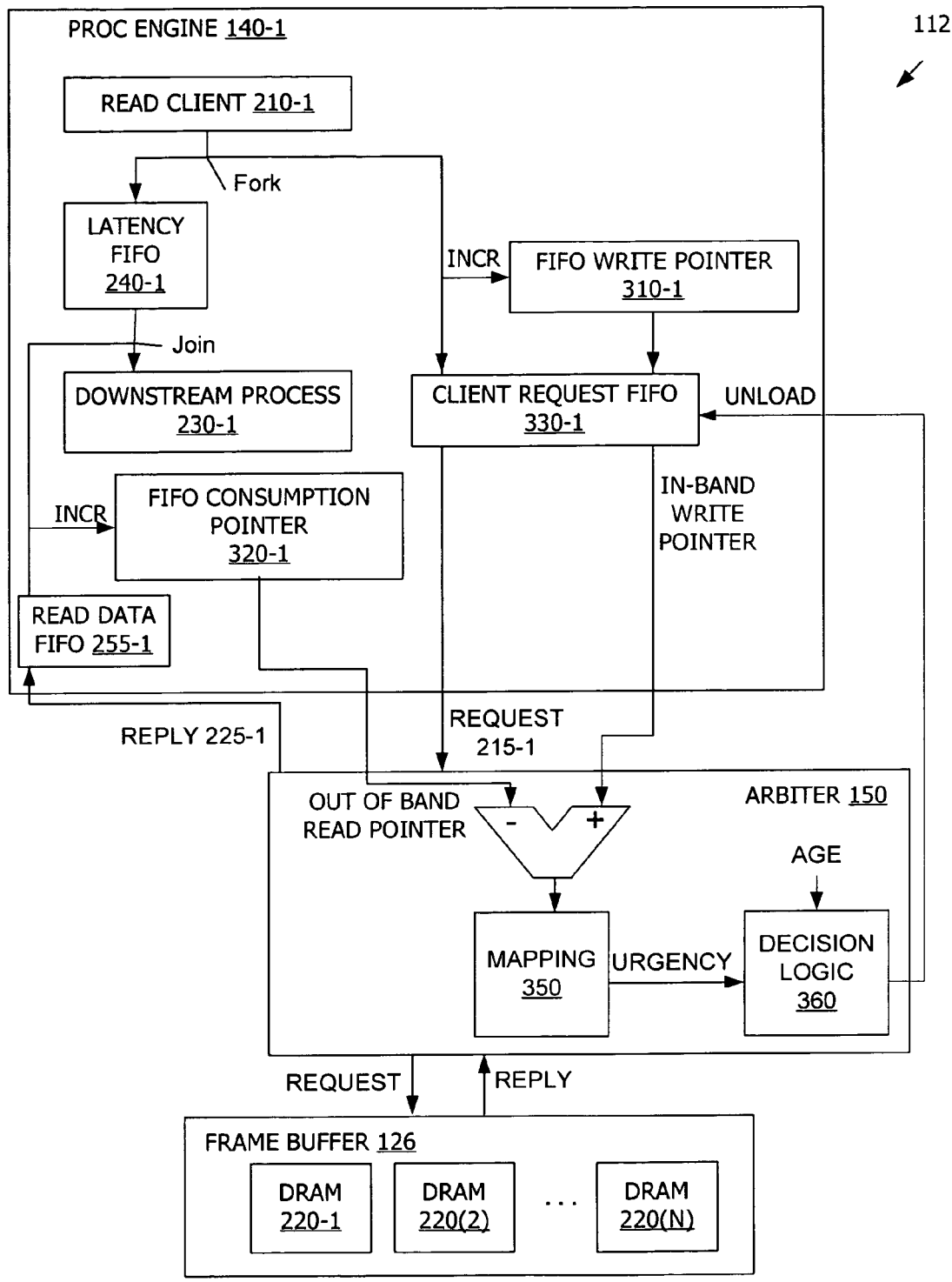
FIG. 3 illustrates a high level circuit topology including circuitry allowing arbiter 150 to determine an urgency level of read client 210-1 of FIG. 2, in one embodiment.

FIG. 3 illustrates a high level circuit topology including circuitry allowing arbiter 150 to determine an urgency level of read client 210-1 of FIG. 2, in one embodiment. Although only processing engine 140-1 is depicted in FIG. 3 for clarity, multiple processing engines 140 may be coupled to arbiter 150 in similar fashion to that shown.

Processing engine 140-1 includes a FIFO write pointer 310-1 that can be considered as a "put" pointer for latency FIFO 240-1. Each time read client 210-1 generates a request such as request 215-1 to arbiter 150, the value of FIFO write pointer 310-1 is incremented so that FIFO write pointer 310-1 operates to count requests generated by read client 210-1. Once incremented, the value of FIFO write pointer 310-1 is transmitted from processing engine 140-1 to arbiter 150 along with request 215-1 from read client 210-1. The value of FIFO write pointer 310-1 can be considered as a sequence number for the request, and is also referred to herein as an "in-band" pointer.

Processing engine 140-1 also includes a FIFO consumption pointer 320-1 that can be considered as a "get" pointer for latency FIFO 240-1. Each time processing engine 140-1 consumes data with a join operation such as reply 225-1 for use by downstream process 230-1, FIFO consumption pointer 320-1 is incremented so that FIFO consumption pointer 320-1 operates to count replies received by downstream process 230-1. The value of FIFO consumption pointer 320-1 is transmitted from processing engine 140-1 to arbiter 150, and is also referred to herein as an "out-of-band" pointer.

As described further below, arbiter 150 computes a difference between the in-band value of FIFO write pointer 310-1 at the arbiter input and FIFO consumption pointer 320-1 so that arbiter 150 can determine urgency of the corresponding request. The difference between the values of FIFO write pointer 310-1 and FIFO consumption pointer 320-1 is compared to one or more predetermined threshold values stored in mapping (e.g., look up table) 350, and an urgency value is determined. The urgency value is used by decision logic 360 to determine when data will be required by processing engine 140-1.

Specifically, when FIFO consumption pointer 320-1 has advanced to the same value as FIFO write pointer 310-1, as determined by a zero difference between the pointers, this means that downstream process 230-1 has "consumed" the same number of replies as have been granted by arbiter 150. In other words, if there is a zero difference between FIFO write pointer 310-1 at the arbiter input and FIFO consumption pointer 320-1, the most recent request has propagated through latency FIFO 240-1 and downstream process 230-1 is urgently waiting for data to be returned from arbiter 150. If reply 225-1 is not urgently returned to processing element 140-1, then downstream process 230-1 will starve for data.

On the other hand, if the difference between FIFO write pointer 310-1 and FIFO consumption pointer 320-1 is large, this means that there are still a large number of requests queued up in latency FIFO 240-1, such that the most recent request issued by read client 210-1 into arbiter 150 will not be needed by downstream process 230-1 for some time. Therefore, the request most recently received by arbiter 150 has low urgency.

In some embodiments, mapping 350 includes a look up table with multiple predetermined or programmable thresholds for mapping a computed difference to urgency, so that a request can be determined to be low, medium, or high urgency in arbiter 150. For example, where each processing engine 140 has a latency FIFO 240 of depth 100 entries, if the difference between FIFO write pointer 310-1 and FIFO consumption pointer 320-1 is in the range 0 to 25, mapping 350 is such that decision logic 360 of arbiter 150 treats the request as high priority. A difference in the range of 26 to 45 is such that decision logic 360 of arbiter 150 treats the request as medium priority, and a difference greater than 46 is treated as low priority by decision logic 360.

In some embodiments, mapping 350 comprises a computation engine (not shown), for example to provide a computed nonlinearity between the difference of FIFO write pointer 310-1 and FIFO consumption pointer 320-1 and the resulting urgency used in decision logic 360. For example in some embodiments, values of FIFO write pointer 310-1 and FIFO consumption pointer 320-1 are quantized to 3-bits each, but the difference computed in arbiter 150 is a 6-bit quantity. The computation engine in mapping 350 maps the 3-bit quantities into corresponding 6-bit quantities.

In some embodiments, FIFO write pointer 310-1 and FIFO consumption pointer 320-1 are initialized to the same starting value to simplify computations in mapping differences to resulting urgency for use by decision logic 360. In some embodiments, FIFO write pointer 310-1 and FIFO consumption pointer 320-1 each include enough bits of resolution such that the difference is deeper than the depth of the latency FIFO 240-1.

In some embodiments, latency FIFO 240-1 has a depth that is a power of 2, and put and get pointers of latency FIFO 240-1 are directly used as FIFO write pointer 310-1 and FIFO consumption pointer 320-1, respectively. In other embodiments, latency FIFO 240-1 has a depth that is not a power of 2, but "virtual" FIFO counters are created whereby the depth of latency FIFO 240-1 is rounded up to a depth that is a power of 2. For example in some embodiments, latency FIFO 240-1 has a depth of 23 entries. Accordingly, FIFO write pointer 310-1 and FIFO consumption pointer 320-1 each have 5 bits of resolution (32 states). As such, put and get pointers of latency FIFO 240-1 are not directly used as FIFO write pointer 310-1 and FIFO consumption pointer 320-1, respectively. In other words, rather than computing differences based on a 23 entry FIFO depth in arbiter 150, virtual FIFO counters are created that are each 32 entries deep to simplify computation of differences and mapping to urgency in arbiter 150.

The mapping of pointer values to urgency may be directly provided by mapping 350 rather than by first computing a difference, in some embodiments. In such embodiments, rather than first computing a difference between FIFO write pointer 310-1 and FIFO consumption pointer 320-1 and providing the difference to mapping 350, the values of FIFO write pointer 310-1 and FIFO consumption pointer 320-1 are directly provided into mapping 350 so that mapping 350 can determine a corresponding urgency level directly from the respective pointer values.

Advantageously, by providing up-to-date pointer values from processing engines 140 to arbiter 150, arbiter 150 is provided with information allowing arbiter 150 to "know" how soon each of the processing engines 140 is going to starve for data. In this fashion, decision logic 360 in arbiter 150 can make better decisions in prioritizing requests received from multiple clients. For example, arbiter 150 can take the difference of FIFO write pointer 310-1 at the output of client request FIFO 330-1 and FIFO consumption pointer 320-1 and estimate how soon reply 225-1 will be required by downstream process 230-1, thereby preventing stalling in processing engine 140-1. Based on how full latency FIFO 240-1 is, decision logic 360 can prioritize the request and service the request in a timely manner.

Mitigating Artificial Urgency Determinations

The difference-based urgency described above works well for "isochronous" processors. As used herein, an isochronous processor includes any data processing device that is configured to receive input data and/or deliver output data on a prescribed schedule. For example, processing engine 140-1 may be configured to deliver output signals to display device 110 (FIG. 1) at a prescribed frame rate. As such, read client 210-1 and downstream process 230-1 may be configured to process information in a manner such that latency FIFO 240-1 remains fairly constant (e.g., if latency FIFO 240-1 fills or empties, then processing engine 140-1 may starve for data and violate its intended function as an isochronous processor). Therefore, because the difference computed between FIFO write pointer 310-1 and FIFO consumption pointer 320-1 in arbiter 150 is a bounded difference for isochronous processors, the difference-based urgency described above works well for isochronous processors.

However, an issue may arise upon initialization, or for non-isochronous processors. For example, upon initialization, FIFO write pointer 310-1 and FIFO consumption pointer 320-1 are typically set to the same value. In this case, the difference between in-band FIFO write pointer at the arbiter and FIFO consumption pointer 320-1 is zero such that arbiter 150 may treat the initial request from read client 210-1 as artificially urgent. Similarly, if latency FIFO 240-1 routinely fills, empties, fills, empties, and so on, for example because of variances over time of read client 210-1 and/or downstream process 230-1 in a non-isochronous processor, the emptying of latency FIFO 240-1 can cause artificial urgency in arbiter 150.

Accordingly, arbiter 150 in some embodiments includes one or more mechanisms to mitigate such artificial urgency determinations. In some embodiments, a conventional age-based determination is used by decision logic 360 to mitigate the effects of artificial urgency determined from the difference of the pointers. In a conventional age-based determination, an arbiter includes counter circuitry configured to determine how long a particular request has been waiting to be serviced. Generally, older requests are given higher priority than recently-received requests.

Therefore, in some embodiments, decision logic 360 takes the minimum of the age-based urgency value, and the difference-based urgency value described above. In other embodiments, decision logic 360 multiplexes between the age-based and difference-based urgency values. For example, if the difference between FIFO write pointer 310-1 and FIFO consumption pointer 320-1 exceeds a predetermined amount (e.g. if latency FIFO 240-1 has more than a threshold number of entries), then decision logic 360 uses the difference-based urgency value. Alternatively, if latency FIFO 240-1 has fewer than a threshold number of entries, then decision logic 360 uses the age-based urgency value. Note that there is a distinction between the in-band pointer seen at arbiter 150 and FIFO write pointer 310-1 in these embodiments. While urgency is calculated using the in-band FIFO write pointer at arbiter 150, FIFO write pointer 310-1 is used in determining whether latency FIFO 240-1 is empty, and/or whether to use a different urgency mechanism.

To prevent oscillations or extreme fluctuations in urgency values, for example where latency FIFO 240-1 is close to a switching or discontinuity point between age-based urgency and difference-based urgency, in some embodiments once decision logic 360 determines to use the difference-based urgency value, the switch is "sticky." For example in some embodiments, once decision logic 360 determines to use the difference-based urgency value, a flip-flop keeps decision logic 360 in the difference-based mode until the associated request is processed (i.e., retrieved from memory and returned to downstream process 230-1).

Urgency Determination in Arbiter 150 for Write Clients

As compared to read clients, computing urgency for a write client in arbiter 150 is relatively less complex.

Figure 4:
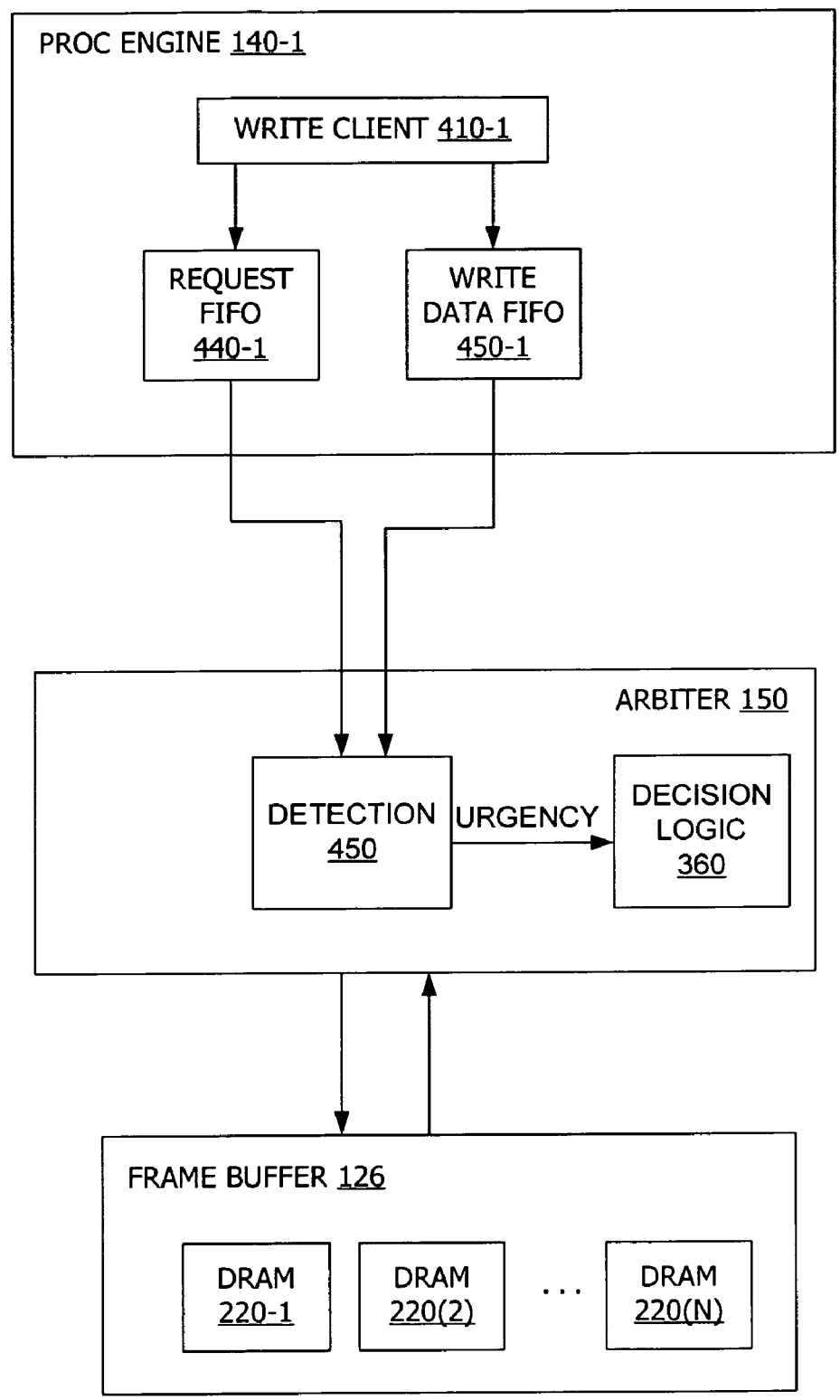
FIG. 4 illustrates a high level circuit topology including circuitry allowing arbiter 150 to determine an urgency level of write client 410-1 in processing engine 140-1, in one embodiment.

FIG. 4 illustrates a high level circuit topology including circuitry allowing arbiter 150 to determine an urgency level of write client 410-1 in processing engine 140-1, in one embodiment. Although only one processing engine 140-1 is depicted in FIG. 4 for clarity, multiple processing engines 140 are typically coupled to arbiter 150 in similar fashion to that shown.

Processing engine 140-1 includes request FIFO 440-1 and write data FIFO 450-1. Each time write client 410-1 generates a request to write data to memory (e.g., one of the DRAMs 220 of frame buffer 126) via arbiter 150, write client 410-1 stores information associated with the write request in request FIFO 440-1 and write data FIFO 450-1.

Put and get pointers for each of request FIFO 440-1 and write data FIFO 450-1 are provided to a detection circuit 450 in arbiter 150. If either request FIFO 440-1 or write data FIFO 450-1 is full, then write client 410-1 will stall because write client 410-1 has no buffer space in which to put the information associated with the write request.

Therefore, detection circuit 450 in arbiter 150 is configured to detect, based on pointers for request FIFO 440-1 and write data FIFO 450-1, if either request FIFO 440-1 and write data FIFO 450-1 is nearly full (by a predetermined number of entries less than being completely full). If either request FIFO 440-1 or write data FIFO 450-1 is nearly full, urgency of servicing write client 410-1 is high. Accordingly, decision logic 360 is configured to treat the request as urgent. In some embodiments, a mapping circuit similar to mapping 350 of FIG. 3 is included in (or coupled to) decision circuit 450, so that arbiter 150 can determine urgency of write requests as low, medium, or high urgency.

Figure 5A:
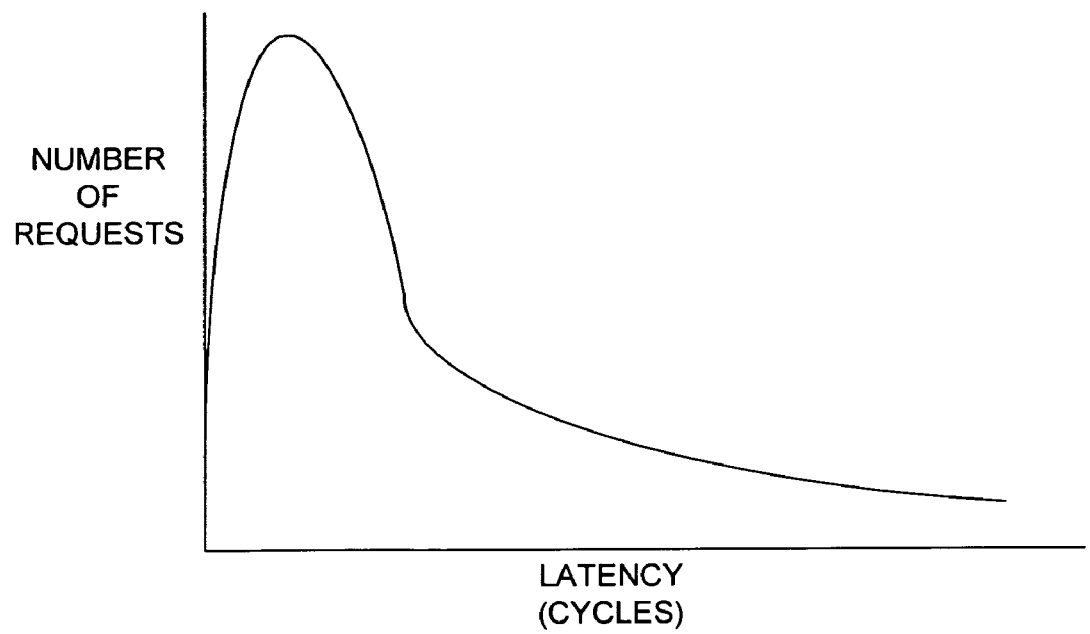
FIG. 5A illustrates a conceptual histogram of memory latency for the system of FIG. 2.
Figure 5B:
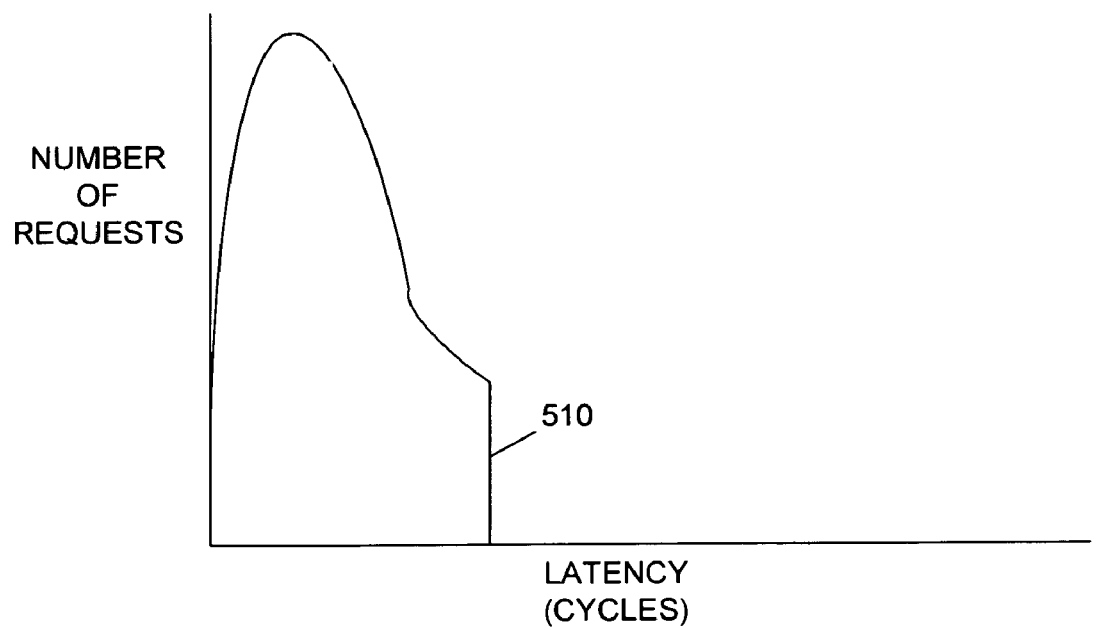
FIG. 5B illustrates a conceptual histogram of memory latency for the systems of FIGS. 3-4 with urgency determination for clients, in one embodiment.

FIG. 5A illustrates a conceptual histogram of memory latency for a system including a conventional arbiter, and FIG. 5B illustrates a conceptual histogram of memory latency for the systems of FIGS. 2-4 with urgency determination for clients.

As depicted in FIG. 5A, where a conventional arbiter responds to requests in order and/or does not base decisions on urgency of clients, it is frequently the case that a stall by one or more clients will cause other clients to stall, particularly with multiple pipelined clients operating in parallel. For example with multiple pipelined clients operating in parallel, there are may different pipelines being forked and joined throughout graphics subsystem 112. Graphics subsystem 112 includes some pipelines in parallel and some pipelines in series, such that if one pipeline stalls, eventually the other pipelines will be affected.

However, as depicted in FIG. 5B, an advantage of arbiter 150 that incorporates a determination of urgency of clients in decision logic 360 is that memory latency is such that clients do not necessarily starve for data or stall. For example, even if a first client issues one or more requests that incur long latency, arbiter 150 is configured to determine whether a second client is close to stalling, and can service the request of the second client in time to prevent the second client from stalling. As such, the systems and methods described with respect to FIGS. 3 and 4 is that overall latency is reduced and capped by a boundary 510.

Note that overall system latency may be memory bandwidth limited or client limited. System latency is memory bandwidth limited, for example, if arbiter 150 and frame buffer 126 provide lower bandwidth than requested by the multiple processing engines 140. Alternatively, system latency may be client limited if the multiple processing engines 140 cannot utilize all the bandwidth provided by arbiter 150 and frame buffer 126 (e.g., the execution of a program executing on processing engine 140-1 is client limited if read client 140-1 and downstream process 230-1 cannot process data as fast as requests can be serviced the memory system comprising arbiter 150 and frame buffer 126).

If the systems of FIGS. 3 and/or 4 are memory bandwidth limited, then boundary 510 will move to the left or right in the distribution according to requests generated by clients and available memory bandwidth. However, clients such as read client 210-1 are bounded in latency, so that a stall by a single client may not necessarily cause a stall of other clients in the system. With the systems and methods described with respect to FIGS. 3 and 4, arbiter 150 measures the latency tolerance of clients directly, and can respond to high urgency requests dynamically.

Considering that system 100 operates in a variety of operating conditions, over a variety of clock settings, DRAM timing configurations, different application programs in processing engines 140, and so on, the curves depicted in FIGS. 5A and 5B are not static, but instead are dynamic and may change. A conventional arbiter that responds to requests in order and/or does not base decisions on urgency of clients typically does not respond dynamically to changes in system 100. However, arbiter 150, by basing decisions in decision logic 360 at least partially on urgency of clients, can respond to such dynamic interface variations.

As an additional potential advantage, the circuitry that allows arbiter 150 to directly measure latency tolerance of clients is off the critical path from a latency standpoint and has little or no impact on memory latency. Further, arbiter 150 can determine to starve a client that has low urgency (where the data is not needed and will not be needed for some time), such that arbiter 150 can increase the latency seen by a particular request, but without harming the overall performance of the pipeline.

Another potential advantage is that the in-band FIFO write pointer and FIFO consumption pointer 320-1 add no extra lag in the arbitration logic. Many conventional arbiters incorporate pointer-based systems, but the quantities used to make arbitration decisions may be stale or may incur additional lag in the system. In contrast, there may be no lag using the in-band FIFO write pointer and FIFO consumption pointer 320-1 because decision logic 360 receives up to date information indicating where the request into the arbiter is within latency FIFO 240-1 such that decision logic 360 can make a perfect decision at that instant, or within a couple clocks of that instant. In other words, as soon as a request is received by arbiter 150, it does not take a memory latency period back to the client before the priority is allowed to be decreased, as is required in some conventional arbitration logic. Rather, as soon as the request passes the point of decision in decision logic 360, the priority of the next request may be adjusted, with no lag.

One way to view the teachings of FIGS. 3 and 4 is by considering latency as yet another resource to be allocated within system 100. By measuring the latency tolerance of clients directly at any point in time, arbiter 150 can bound latency to those clients that need service the most.

Out of Order Requests

In some embodiments, clients such as read client 210-1 (FIG. 3) consume data in order of the requests generated by the client. In such embodiments, arbiter 150 generally services the requests in order generated by the clients.

However, in alternative embodiments described further below with respect to FIG. 6, clients can generate requests out of order and/or arbiter 150 can service the requests out of order in an order that makes better use of memory. For example, in some applications running on processing engine 140-1, a request may not depend upon a reply to a previous request (e.g., where processing engine 140-1 performs the same shading operation on pixel after pixel, there is no dependency of a second pixel on a first pixel). Accordingly, latency FIFO 240-1 is deep enough so that multiple requests can be aggregated and the requests serviced out of order in arbiter 150 to improve efficiency. For example, arbiter 150 may aggregate requests on a per row bank basis in a DRAM 220 bank to reduce the management overhead of switching between banks in frame buffer 126. Aggregating requests and making accesses within banks of frame buffer 126 can reduce latency in memory and utilize memory bandwidth more efficiently.

Advantageously, the systems and methods described herein allow requests from multiple clients to be serviced out of order, while bounding how far out of order the requests can get. For example in some embodiments, decision logic 360 is configured to use an age-based urgency metric whereby as a request ages, the priority gets higher for the request. Alternatively, decision logic 360 can use a difference-based metric. Thus, requests from multiple clients can be processed not in the order of arrival of requests from those clients, but in an order that makes efficient use of memory.

Efficiency Determination in Arbiter 150

From a memory bandwidth standpoint, when graphics processing subsystem 112 is memory bandwidth limited, clients such as read client 210-1 oversubscribe the memory interface, in which case at least one of the clients will stall and have to wait, which in turn causes memory latency to rise. However, as described further below, when the memory interface is oversubscribed, it may be desirable to not cycle back and forth between servicing reads and writes in arbiter 150, even if urgency of clients suggests doing so, because switching between reads and writes incurs a "read/write turn penalty" (a time needed to switch between reading from or writing to memory, or vice versa). The read/write turn (or turnaround) penalty from cycling between servicing reads and writes uses up available bandwidth in the memory interface. Further, when the memory interface is oversubscribed, it may be desirable to service requests in a manner that reduces management overhead in memory (e.g., overhead such as switching between rows of DRAM 220).

Figure 6:
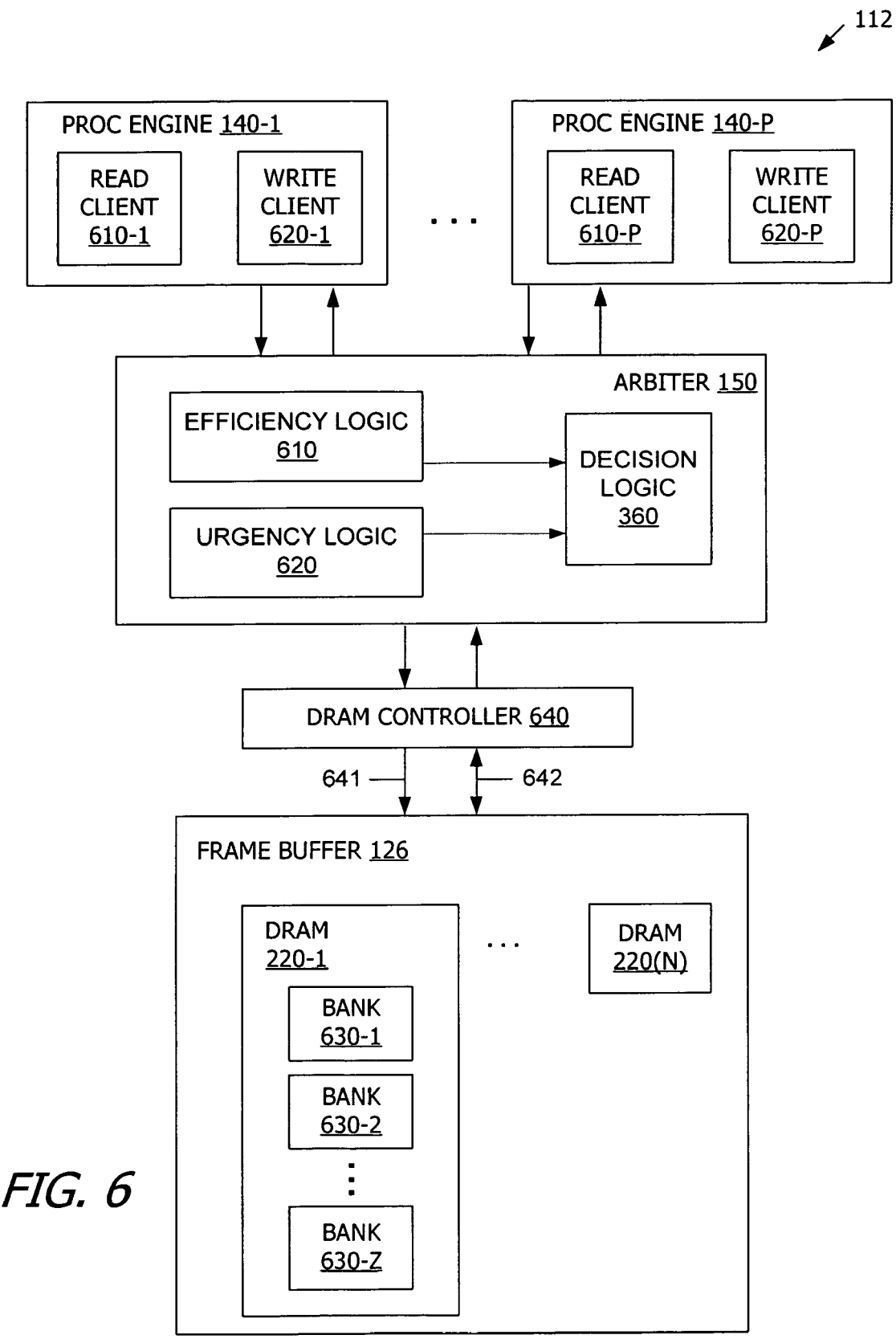
FIG. 6 illustrates an functional block diagram of graphics processing subsystem 112 in which arbiter 150 includes efficiency logic 610 for computing efficiency terms, and urgency logic 620 for computing urgency terms, in one embodiment.

FIG. 6 illustrates an functional block diagram of graphics processing subsystem 112 in which arbiter 150 includes efficiency logic 610 for computing efficiency terms, and urgency logic 620 for computing urgency terms, in one embodiment. As described further below, efficiency logic 610 is configured to compute efficiency terms (or metrics) for requests received into arbiter 150 so that decision logic 360 can arbitrate between requests in a manner that achieves an efficient use of the memory interface. Optionally, decision logic 360 may receive input from urgency logic 620 to perform the urgency determinations described with respect to FIGS. 2 to 5.

In the embodiment depicted in FIG. 6, separate banks 630 of DRAM 220 in frame buffer 126 are accessed by DRAM controller 640 via a control bus 641 and a data bus 642. For clarity, only DRAM 220-1 is depicted as having Z banks 630-1 to 630-Z (collectively, banks 630), although other DRAMs 220 in frame buffer 126 may comprise any number of banks. Although described below as providing separate functions for the sake of clarity, the functions of DRAM controller 640 may be incorporated into arbiter 150.

Control bus 641 includes address and control signals that allow DRAM controller 640 to command the associated DRAM 220, for example to precharge a bank such as bank 630-1, activate a row in bank 630-2, or read/write to a given column address in bank 630-1. Data bus 642 is 256 data bits wide in some embodiments, divided into 64-bit wide data partitions. For each data partition of 64-bits on data bus 642, only one associated command can occur at a time on control bus 641, to command either a read or write at the associated DRAMs 220.

In some embodiments, precharging and activation commands on control bus 641 may be pipelined to different banks 630 of DRAMs 220. For example, in order for DRAM controller 640 to read and/or write data to bank 630-1, bank 630-1 needs to be "opened" to a particular row. To access a new row in the same bank, DRAM controller 640 closes (precharges) the currently open bank 630-1, activates bank 630-1 to the new row, then performs reads and/or writes in the new row. In some embodiments with multiple banks 630, DRAM controller 640 may pipeline multiple accesses so that while one bank (e.g., bank 630-1) is being closed, another bank (e.g., bank 630-2) is being activated, and yet another bank (e.g., bank 630-3) is performing reads or writes of data. DRAM controller 640 may cycle through the multiple banks to perform a predetermined number of accesses, e.g., to perform 6 read accesses on bank 630-1, 6 read accesses on bank 630-2, 6 read accesses on bank 630-3, and so on.

However, performing bank management functions (e.g. precharging bank 630-1) requires some amount of bank management overhead time in which useful data may not be flowing on data bus 642. DRAM controller 640 may cycle through the multiple banks 630 and be relatively efficient (minimize overhead time needed for bank management) as long as the size of data transferred on data bus 642 is large enough to "cover" the overhead time. Or, if DRAM controller 640 pipelines accesses, the overhead time needed to perform precharging and activation may be covered, in that the overhead time is not introducing gaps on data bus 642, and the bank management overhead is hidden. An issue with DRAM controller 640, therefore, is that at high memory interface speeds, the size of data transfers necessary to hide the overhead time needed for bank management (e.g. to switch between banks 630) may exceed the size of useful requests the clients can generate. To the extent which this occurs, efficiency and, consequently, latency suffers.

In addition, the amount of overhead time needed for switching between performing a read operation and performing a write operation within a bank 630 (i.e., to perform a "read/write turn" on data bus 642) may comprise significant memory overhead time which adds to memory latency. Specifically, to change from performing a read operation to performing a write operation, or vice versa, necessitates a turn on data bus 642. Data flows in a read operation from one of the DRAMs 220 to one of the processing engines 140 (up the page in FIG. 6), while data flows in a write operation in the opposite direction (down the page in FIG. 6). Turning data bus 642 from read to write or vice versa, incurs a read/write turn penalty, a minimum amount of time needed to transition data bus 642 from reading to writing, or vice versa.

If graphics subsystem 122 turns too frequently between reads and writes, the read/write turn penalty can consume excessive memory bandwidth. Generally, a large number of successive reads or writes without turning data bus 642 yields relatively high efficiency, since the read/write turn penalty is amortized over a large number of reads or writes. Alternatively, a relatively small number of successive reads or writes before a read/write turn yields relatively poor efficiency, since the read/write turn penalty prevents efficient utilization of the memory interface. For example, if it takes 21 DRAM clocks to turn data bus 642 within a period of 500 clock cycles of successive reads or writes, then there are 500−21=479 clocks of actual data transfer. Therefore, the efficiency of the memory system is 479/500=95.8%. Alternatively, with only 50 clock cycles of successive reads or writes, then there are only 50−21=29 clocks of actual data transfer, yielding an efficiency of 29/50=58%.

In a conventional arbiter, the decision logic typically includes a fixed preference for servicing a request that is in the current direction (read or write). For example, if the arbiter is currently servicing a read request, then a second read request might be preferred by a fixed amount over a write request. However, a conventional arbiter typically includes no adjustment for the number of requests that have been serviced since the previous read/write turn (whether a small number of reads or writes have been serviced since the previous read/write turn in which case efficiency is relatively low, or whether a large number of requests have been serviced since the last read/write turn in which case efficiency is relatively high).

Further, a conventional arbiter typically includes no adjustment for whether the read/write turn penalty can be overlapped with bank management overhead. Conventionally, if one bank is open and a second bank is not ready, the arbiter gives priority to requests going to the open bank. Typically the arbiter does not determine or quantify the extent of bank management overhead, or how much of a penalty there is for opening the second bank.

In contrast, in some embodiments, efficiency logic 610 of arbiter 150 is configured to adjust read/write turns among the several read clients 610 and write clients 620 to maximize efficiency of data transfer on data bus 642. For example, as described above, arbiter 150 may service requests out of order based upon urgency of clients, as determined by urgency logic 620. In addition, efficiency logic 610 may determine that a number of requests are queued up and are intended for the same row in bank 630-1, for example. Efficiency logic 610 may determine that it is more efficient to transmit requests to the same row in bank 630-1, even if doing so provides data out of order with respect to requests issued by clients, because doing so provides a more efficient use of the memory interface.

In addition, efficiency logic 610 of arbiter 150 is configured to look at rows and banks together in some embodiments. For example, if a DRAM bank is activated to row A, then a successive request to row B of the same bank would cause the bank to be precharged and activated if accepted, so request B may be given a lower efficiency term in efficiency logic 610. Conversely, requests to the same bank and same row may be given relatively high efficiency terms because the requests can go back-to-back. Further, requests to a different bank than the previously accessed banks may be given relatively high efficiency terms because may be enough time to precharge the bank and make it ready to activate to a different row.

In some embodiments, arbiter 150 is configured to issue requests that access the same row-bank in the same read or write direction until a predetermined quanta of data transfer is met, which may involve requests from the same client. After servicing such requests, arbiter 150 may choose another bank that has the same row if it is activated. Alternatively, arbiter 150 may choose a bank that may have a different row than previously accessed, but that was far enough back in time to cover precharging the bank and activating the bank to the new row while other banks are transferring data.

Therefore in some embodiments, decision logic 360 is configured to use a "desire" function that incorporates efficiency terms generated by efficiency logic 610 in addition to urgency terms generated by urgency logic 620 when arbitrating between accesses to the DRAMs 220. In some embodiments, the efficiency terms and the urgency terms are combined by adding the efficiency terms and urgency terms together, and the efficiency terms and the urgency terms may be scaled by appropriate values. In such embodiments, each of the efficiency terms and the urgency terms may have a range of values such that the sum never exceeds a maximum value that can be represented by the number of bits in the desire function. For example, a desire function of four bits resolution has a maximum value of 15 (decimal), and the efficiency terms and urgency terms may be scaled such that their sum adds to a desire function of 15 or less.

In some embodiments, the urgency terms may reach very high or critical levels, and the desire function may include an OR of a near maximum or maximum value (e.g., 14 or 15 for a four bit desire function) in order to force the arbiter to give fast service regardless of the efficiency terms. In some embodiments, the desire function may include tables or computed functions (not shown) used to map the efficiency terms and/or urgency terms into intermediate components that are then combined to result in a final desire function.

In some embodiments, efficiency logic 610 in arbiter 150 assigns a penalty for a request that requires a read/write turn. The read/write turn penalty may include a programmable decay schedule such that, over time, arbiter 150 reduces the weighting of the read/write turn penalty in decision logic 360. In other words, the read/write turn penalty may be reduced in weight during a number of successive reads or writes on data bus 642. In this fashion, once the read/write turn penalty has been amortized over a number of successive reads or writes on data bus 642, the read/Write turn penalty matters less in decision logic 360.

In some embodiments, efficiency logic 610 computes efficiency terms based on one or more determinations of read/write turn penalty (read/write turn overhead) and bank management penalties (overhead time including, but not restricted to, precharge time (tRP) and RAS-to-CAS delay time (tRCD)). For example if a particular bank 630 is not already ready (e.g., bank 630-1 has not been precharged), the bank management penalty (time needed for precharging bank 630-1) might overlap with the read/write turn penalty. Thus, in some embodiments the total penalty for DRAM-related overhead is the maximum of the read/write turn penalty and bank management penalties, thereby providing no additional directional preference if the read/write turn penalty completely overlaps with one or more bank management penalties. In other words, it may be possible to overlap or "hide" the read/write turn penalty within bank management overhead, or vice versa, such that it may be relatively efficient for arbiter 150 to make a turn on data bus 642 while performing bank management functions that are not hidden by data transfers, as opposed to staying in the same direction on data bus 642.

In some embodiments, efficiency logic 610 computes efficiency terms based on the read/write turn penalty and bank management penalties, in addition to consideration of a "minimum efficient quanta size" for reads or writes. For example, assume arbiter 150 needs 12 DRAM clocks of data transfer per row bank to be efficient (e.g., no dead clocks on DRAM data bus) at cycling through three banks 630. If arbiter 1-50 transfers 12 DRAM clocks of data transfer for bank 630-1, 12 DRAM clocks of data transfer for bank 630-2, then 12 DRAM clocks of data transfer for bank 630-3, then read/write turn penalty and bank management penalties are fully hidden. But if arbiter 150 transfers 12 DRAM clocks of data transfer for bank 630-1, 12 DRAM clocks of data transfer for bank 630-2, and only 6 for DRAM clocks of data transfer for bank 630-3, then arbiter 150 would have 6 clocks spare, and would have to wait for 6 clocks. If data transfer for bank 630-1 could go in the same direction (read or write), the 6 spare clocks may be unutilized, and arbiter 630 may wait until bank 630-1 is ready. Alternatively, if the read/write turn penalty costs 9 clocks, then it is preferable to stay in the same direction, although not as preferable as if arbiter 150 could have been fully efficient in the first place.

Although described as penalties, the desire functions can be alternatively phrased using preferences instead of penalties, as would be apparent to a person of ordinary skill in the art.

Flexible Arbitration Using Efficiency and Urgency Terms for Out of Order Clients In some embodiments, clients such as read client 610-1 and write client 620-1 are highly pipelined and can manage data out of order. With out of order clients, arbiter 150 can issue requests to frame buffer 126 in a manner that is out of order with respect to the order of requests received in arbiter 150, and in a way that is a more efficient use of the memory interface. In some embodiments, arbiter 150 can balance between urgency needs of clients and efficiency of the memory system.

A potential advantage of some embodiments where decision logic 360 of arbiter 150 is configured to service requests in a dynamically responsive manner is that arbiter 150 services requests in a manner that is both as efficient as possible, and does not neglect the urgency of the clients. For example, if the requests from the clients drive decision logic 360 to turn data bus 642 more often than would otherwise be desired from an efficiency standpoint, then decision logic 360 will turn the bus more often to satisfy the urgency needs of the clients. However, if the requests of the clients are not urgent, then decision logic 360 can service the requests in a manner that delays a turn on data bus 642, to prevent the read/write turn penalty from negatively impacting efficiency. In this manner, arbiter 150 can readily adapt to the changing demands of the clients and the changing bandwidth capabilities of the memory interface.

Alternative Embodiments

Although described above with respect to arbitrating requests from GPU 112 to frame buffer 126, the systems and methods described above are applicable to any pipelined client, such as an MPEG coding or decoding engine. In particular, the systems and methods described above are applicable to isochronous clients, for display, audio, or streaming video. Further, although the systems and methods are described with respect to DRAM, the systems and methods described above are applicable to any memory such SRAM or other memory types.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A system comprising:
a first client configured to generate a first request for access to a resource;
a second client configured to generate a second request for access to the resource; a latency FIFO configured to buffer the first request; and
an arbiter configured to receive the first request for access and the second request for access and to grant access to the resource in an order based at least in part on a comparison of an urgency of the first request and an urgency of the second request; wherein the arbiter includes an input configured to: receive the first request, receive a read pointer of the latency FIFO, and receive an in-band pointer associated with a write pointer of the latency FIFO;
wherein the first client is further configured to generate a sequence number for the first request and transmit to the arbiter the sequence number and a number of replies consumed by the first client and wherein the arbiter is configured to determine the urgency of the first request based on a difference between the sequence number and the number of replies consumed by the first client.

2. The system of claim 1 wherein the arbiter is further configured to grant access to the resource in an order based in part on a determination of efficiency for servicing the first request and a determination of efficiency for servicing the second request.

3. The system of claim 1 wherein the first request comprises a read request and the resource comprises a memory.

4. The system of claim 1 wherein a depth of the latency FIFO is determined based at least upon an access time for a reply to the first request from the resource, a depth of a request FIFO coupled to the first client, and a depth of a read data FIFO coupled to the arbiter.

5. The system of claim 1 wherein the first client is further configured to generate a sequence number for the first request, buffer the first request, and transmit to the arbiter an indication of the depth of the first request in the buffer, and the arbiter is configured to determine urgency of the first request based on a difference between the sequence number and the indication of the depth of the first request in the buffer.

6. The system of claim 1 wherein the arbiter is further configured to grant access to the resource based in part on a comparison of an age of the first request and an age of the second request.

7. The system of claim 1 wherein the arbiter is further configured to grant access to the resource based in part on a comparison of an age of the first request and an age of the second request, if the comparison of urgency of the first request and urgency of the second request is less than a predetermined value.

8. The system of claim 1 wherein the first client is isochronous.

9. The system of claim 1 wherein the first client is further configured to generate a request number for the first request, pipeline the first request, and transmit to the arbiter an indication of the depth of the first request in the pipeline and wherein the arbiter includes a look up table configured to determine urgency of the first request based in part on a difference between the request number and the depth of the first request in the pipeline and in part on an urgency threshold.

10. The system of claim 9 wherein the urgency threshold is programmable.

11. The system of claim 9, wherein the urgency threshold is predetermined.

12. The system of claim 1 wherein the first request comprises a write request and the resource comprises a memory and wherein the arbiter is configured to determine the urgency of the first request by detecting whether a request buffer coupled to the first client is a predetermined number of entries less than full.

13. The system of claim 1, wherein a lower value of the difference between the sequence number and the number of replies consumed by the first client indicates higher priority, and a higher value of the difference between the sequence number and the number of replies consumed by the first client indicates lower priority.

14. A system comprising:
a first processing engine configured to execute a first process, the first process configured to generate a first request for access to a memory;
a second processing engine configured to execute a second process, the second process configured to generate a second request for access to the memory; a latency FIFO configured to buffer the first request; and
an arbiter configured to receive the first request for access and the second request for access and to grant access to the memory in an order based at least in part on a comparison of an urgency of the first request and an urgency of the second request; wherein the arbiter includes an input configured to: receive the first request, receive a read pointer of the latency FIFO, and receive an in-band pointer associated with a write pointer of the latency FIFO;
wherein the first client is further configured to generate a sequence number for the first request and transmit to the arbiter the sequence number and a number of replies consumed by the first client and wherein the arbiter is configured to determine the urgency of the first request based on a difference between the sequence number and the number of replies consumed by the first client.

15. The system of claim 14 wherein the arbiter is further configured to grant access to the memory in an order based in part on a comparison of an age of the first request and an age of the second request.

16. The system of claim 14 wherein the arbiter is further configured to grant access based upon a desire function.

17. The system of claim 16 wherein the desire function comprises a scaled urgency of the first request and a scaled efficiency of servicing the first request.

18. The system of claim 16 wherein the desire function includes a mapping of the urgency of the first request into a first intermediate component and a mapping of a scaled efficiency of servicing the first request into a second intermediate component, the first intermediate component and the second intermediate component summed to result in the desire function.

19. The system of claim 14 wherein the arbiter is further configured to grant access to the resource in an order based in part on a determination of efficiency for servicing the first request and a determination of efficiency for servicing the second request.

20. The system of claim 14, wherein a lower value of the difference between the sequence number and the number of replies consumed by the first client indicates higher priority, and a higher value of the difference between the sequence number and the number of replies consumed by the first client indicates lower priority.

21. A system for processing a plurality of access requests to a common resource, the system comprising:
a resource containing data;
an arbiter coupled to the resource and configured to receive and efficiently manage multiple requests for access to the resource, and
a plurality of processing engines coupled to the arbiter and configured to request access to the resource, each processing engine comprising:
a read client configured to generate and output requests for data;
a write pointer buffer coupled to the read client and configured to count a first number of requests that are received from the read client;
a client request buffer that receives, from the read client, requests and that is configured to pass to the arbiter, requests being received from the read client;
a latency buffer coupled to the read client and configured to maintain internal commands and data associated with request from the read client for sending to a downstream process;
a read data buffer configured to receive replies from the arbiter, the replies in response to the requests for data from the read client, and
a consumption pointer buffer coupled to the read data buffer and configured to count a second number of replies consumed by the downstream process,
wherein the arbiter receives the first number and the second number from respective processing engines, and wherein the arbiter uses the respective first and second numbers to determine a priority for replying to requests from respective processing engines.

22. The system of claim 21, wherein the arbiter is configured to determine a priority between multiple requests based on a difference between the first number and the second number of respective processing engines.

23. The system of claim 22, wherein a lower value of the difference between the first number and the second number indicates a higher priority, and a higher value of the difference indicates a lower priority.

* * * * *